(12) United States Patent
Sakon et al.

(10) Patent No.: US 8,941,280 B2
(45) Date of Patent: Jan. 27, 2015

(54) DC MOTOR WITH CONCENTRATED WINDINGS HAVING CONNECTING WIRES RUN THROUGH ARMATURE SLOTS

(75) Inventors: Syouzou Sakon, Osaka (JP); Yasuharu Uchida, Osaka (JP); Jiro Okubo, Fukui (JP); Kazuo Toya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 257 days.

(21) Appl. No.: 13/581,443

(22) PCT Filed: Mar. 29, 2011

(86) PCT No.: PCT/JP2011/001850
§ 371 (c)(1),
(2), (4) Date: Aug. 27, 2012

(87) PCT Pub. No.: WO2011/121991
PCT Pub. Date: Oct. 6, 2011

(65) Prior Publication Data
US 2012/0319520 A1    Dec. 20, 2012

(30) Foreign Application Priority Data
Mar. 30, 2010    (JP) .................................. 2010-078373

(51) Int. Cl.
    H02K 23/38    (2006.01)
    H02K 23/30    (2006.01)
    H02K 3/28     (2006.01)

(52) U.S. Cl.
    CPC ................ H02K 23/30 (2013.01); H02K 23/38 (2013.01)
    USPC .......................................... 310/198; 310/234

(58) Field of Classification Search
    CPC ......... H02K 23/26; H02K 3/28; H02K 23/38; H02K 3/02; H02K 3/12
    USPC .................................................. 310/185–208
    See application file for complete search history.

(56) References Cited

U.S. PATENT DOCUMENTS

2004/0021394 A1 *   2/2004   Maeda et al. .................. 310/195
2004/0178690 A1 *   9/2004   Morimatsu .................... 310/180

FOREIGN PATENT DOCUMENTS

JP    55-125069 A    9/1980
JP    06-253507 A    9/1994
(Continued)

OTHER PUBLICATIONS

Machine translation of WO 2009072280 A1 (published Jun. 2009).*
(Continued)

*Primary Examiner* — Michael Andrews
(74) *Attorney, Agent, or Firm* — Brinks Gilson & Lione

(57) ABSTRACT

A dc motor includes a stator having multiple field magnet poles, and an armature having an armature core, armature coils, and a commutator, and brushes brought into contact with the commutator. The armature coils include concentrated winding coil units wound on respective teeth, and connecting wire units that electrically connect each of the concentrated winding coil units together. A segment group of the commutator includes a first segment and a second segment placed adjacent to each other, to which the concentrated winding coil units are connected, the segment group also includes a third segment disposed next to the adjacent placement, and only the connecting wire unit is connected to the third segment. The connecting wire units include connecting wire units that pass through slots and connect each of the concentrated winding coil units together.

9 Claims, 8 Drawing Sheets

(56) References Cited

FOREIGN PATENT DOCUMENTS

| | | |
|---|---|---|
| JP | 2002-209362 A | 7/2002 |
| JP | 2009-118660 A | 5/2009 |
| WO | WO 2009/072280 A1 | 6/2009 |
| WO | WO 2009072280 A1 * | 6/2009 ............. H02K 23/30 |

OTHER PUBLICATIONS

International Search Report for International Application No. PCT/JP2011/001850, dated Jun. 28, 2011, 2 pages.

* cited by examiner

DC MOTOR WITH CONCENTRATED WINDINGS HAVING CONNECTING WIRES RUN THROUGH ARMATURE SLOTS

This application is a 371 application of PCT/JP2011/001850 having an international filing date of Mar. 29, 2011, which claims priority to JP2010-078373 filed Mar. 30, 2010, the entire contents of which are incorporated herein by reference.

TECHNICAL FIELD

The present invention relates to a dc motor including a brush and a commutator, this dc motor is employed in automotive electronics or electric tools.

BACKGROUND ART

In recent years, electric devices, e.g. automotive electronics, electric tools, have been downsized, light-weighted, and operated at a higher efficiency. This market trend entails requirements for dc motors, which are supposed to be mounted to those devices as power sources, to be smaller in size, lighter in weight, and more efficient in operation.

A dc motor used in automotive electronics or household electric appliances produces greater electric sparks between a brush and a commutator slip (commutator segment) as the motor rotates at a greater rpm, becomes smaller in size and lighter in weight, and produces a greater output power. On top of that, the dc motor is required to have a longer service life as well as higher reliability.

This dc motor, in general, is formed of a stator forming a field magnet, and a rotor confronting the stator with an annular space therebetween. The rotor employs an armature equipped with a commutator and formed by winding a coil on a core. To drive this dc motor, it is needed to feed the armature with electric power, so that the brush connected to an outer power supply with lead wires should be in sliding contact with the commutator.

To increase the number of magnetic poles of magnets employed in the dc motor, it is necessary for various structural elements to be combined optimally. In this context, the structural elements include the number of magnetic poles of the coil relative to the number of magnetic poles of the magnets, a wire connection structure of the winding and so on.

In the wire connection structure for optimizing the motor performance which was built to meet the above needs, a ratio of useless coils to multiple armature coils tends to increase, so that the number of armature coils should be increased to obtain the necessary performance. A solution to the problem thus has unfortunately invited another problem. As a result, a greater change in the inductance has occurred, which adversely causes a voltage waveform and therefore sometimes shortens the service life of the motor. It is thus inevitable to employ a wire-wound structure although this structure somewhat degrades the motor performance. Noises caused by the solution to the same problem also become another problem.

The conventional dc motor discussed above is described hereinafter with reference to FIG. 8, which is an exploded view illustrating a winding method of the armature coil of the conventional dc motor. This conventional dc motor comprises the following structural elements:

a stator having four (4) field magnets;
a core having five (5) teeth;
a commutator having ten (10) segments;
an armature having coils wound on the teeth via wire-connections to the segments; and
a pair of brushes each of which is disposed orthogonally to each other and in sliding contact with the commutator.

The arc lengths of the brushes in sliding contact with the commutator are not greater than 5% of the circumference length of the commutator, namely, the arc length $\leq \pi \times A/20$, where A is the outer diameter of the commutator.

FIG. 8 shows that brush B101 has a positive voltage and makes sliding contact with segment S103, and brush B102 has a negative voltage and makes sliding contact with segment S105. It will be discussed later how each of the coils are powered. Meanwhile, circled numbers 1, 2, 3 and 4 on both sides in FIG. 8 indicate that the same numbers are connected together.

A first electric current path starts from brush B101, and runs through S103, runs around tooth T105, runs through S108, runs around tooth T104, runs through S109, runs around tooth T103, runs through S104, runs around tooth T102, runs through S105, and arrives at brush B102.

A second electric current path starts from brush B101, and runs through S103, runs around tooth T101, runs through S102, runs around tooth T102, runs through S107, runs around tooth T103, runs through S106, runs around tooth T104, runs through S101, runs around tooth T105, runs through S110, runs around T101, runs through S105, and arrives at brush B102.

The dc motor has been improved to meet the required specification, and optimized structures of the dc motor have been proposed. Various techniques have been disclosed, e.g. patent literatures 1 and 2.

In a dc motor equipped with distributed windings, the winding passes over each tooth sequentially, so that coil ends, which is not involved in generating torque, become greater in size. The copper loss at the coil ends lowers the efficiency of the motor, and also causes to enlarge the size of the motor in the axial direction. As x signs in FIG. 8 show, an inverse current runs through some coils, and lowers the motor efficiency. The conventional dc motor discussed above thus still has a room for improvements in terms of achieving a smaller size, a lighter weight, and higher efficiency to satisfy the presently required specifications (e.g. Patent Literature 1).

A dc motor equipped with a concentrated winding or a wave winding also tries to optimize the combination of the number of magnet poles, the number of armature windings, and the number of commutator slips for pursuing higher torque, and achieve higher efficiency, and a compact size. However, as discussed above, this type of conventional dc motor also has a room for improvements in achieving a smaller size, a lighter weight, and higher efficiency to satisfy the presently required specifications (e.g. Patent Literature 2).

Patent Literature 1: Unexamined Japanese Patent Application Publication No. 2002-209362
Patent Literature 2: Unexamined Japanese Patent Application Publication No. S55-125069

DISCLOSURE OF THE INVENTION

A dc motor of the present invention comprises: a stator, an armature, and brushes.

The stator includes multiple field magnet poles. The armature includes the following elements:

an armature core having multiple teeth and slots formed between two adjacent teeth;
an armature coil wound on the teeth and accommodated in the slots; and a commutator having segment group formed of multiple segments.

The brushes feed the armature coil with electric power through their sliding contacts with the segments. The armature coil includes multiple concentrated winding coil units wound on the teeth, and multiple connecting wire units that connect the concentrated winding unit together and make an electrical connection between those units.

The segment group includes first segments to which first ends of the concentrated winding coil units are connected, and second segments to which second ends of the concentrated winding coil units are connected, and third segments to which only the connecting wire units are connected. The first segments are disposed adjacent to the second segments, and the third segments are disposed next to the adjacently disposed first and second segments.

The multiple connecting wire units of the dc motor of the present invention pass through the slots for connecting the concentrated winding coil units together. This structure regulates the sparks between the segments of the commutator, thereby improving the driving efficiency, and downsizing the dc motor.

DETAILED DESCRIPTION OF THE PREFERRED EMBODIMENTS

The exemplary embodiment will be discussed hereinafter with reference to the accompanying drawings.

Embodiment

Figure 1:
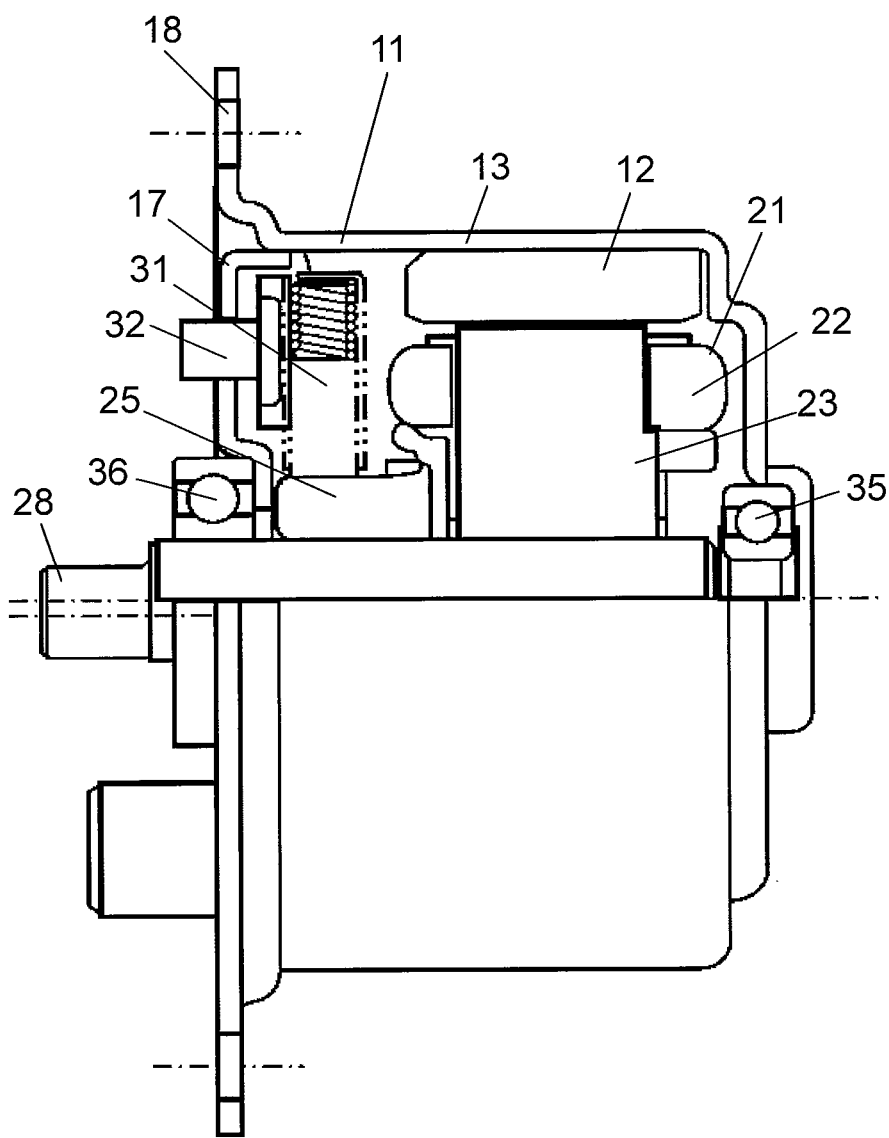
FIG. 1 is a sectional view showing a half of a dc motor in the axial direction in accordance with an embodiment of the present invention.

FIG. 1 is a sectional view showing a half of a dc motor along the axial direction of the embodiment of the present invention. Stator 11 includes magnet 12 on an inner wall of frame 13 formed in a shape of a hollow cylinder and having a bottom, and an open end of stator 11 is covered with bracket 17, to which brush 31 is mounted via brush-holder 32.

Rotor (hereinafter referred to as armature) 21 includes arc-shaped armature core 23 having multiple slots 24, armature coils 22 wound and accommodated in slots 24, output shaft 28 extending through and fixed at the center of armature core 23, and commutator 25 fixed to output shaft 28. Terminals of armature coils 22 are connected electrically to the segments of commutator 25.

Output shaft 28 is rotatably supported by two bearings 35 and 36. Bearing 35 is fixed to frame 13 at its outer ring, and bearing 36 is fixed to bracket 17 at its outer ring. An outer circumference of armature core 23 of armature 21 confronts an inner circumference of magnet 12 of stator 11 with a given space therebetween.

Figure 2:
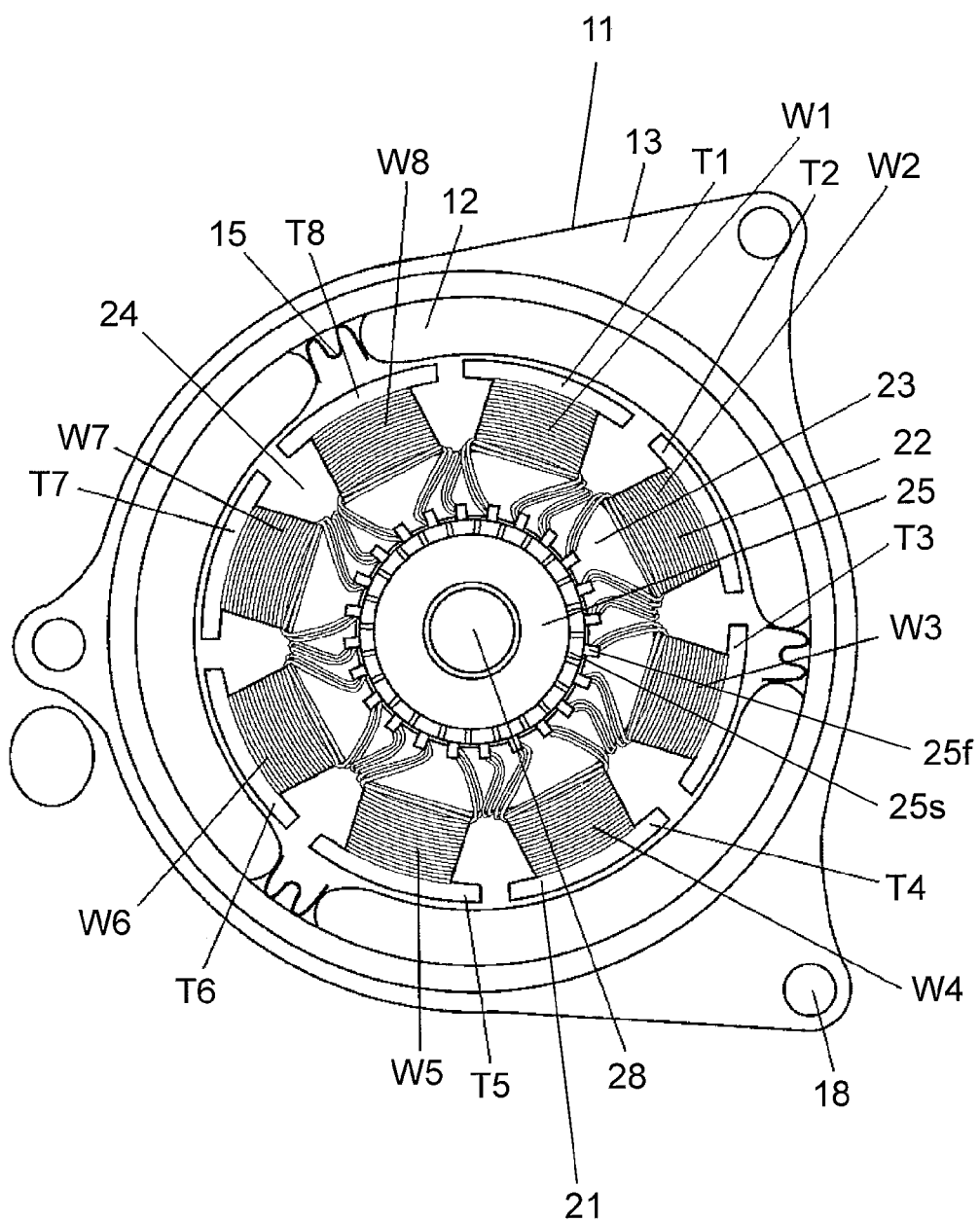
FIG. 2 is a lateral view of the dc motor with a bracket removed.

FIG. 2 is a lateral view of the dc motor with a bracket removed. The structure of the dc motor is discussed in detail with reference to FIG. 2. Frame 13 of stator 11 has mounting holes 18 at three places, and magnet 12 at an inner wall. Magnet 12 is divided into three magnets, and magnet fixing spring 15 is provided between each of the three magnets for fixing and bonding the magnets to the inner wall of frame 13. Each magnet is magnetized to a pair of field magnet poles, i.e. N pole and S pole. Magnet 12 as a whole is thus magnetized to six field magnet poles.

Magnet 12 can be shaped like a ring, and each of the ring's inner wall can be magnetized to N pole-S pole equidistantly and alternately along the circumferential direction, namely, magnet 12 is magnetized to 6 poles. Alternatively, they can be magnetized such that each of the ring shaped magnets is magnetized to N pole and S pole independently, and forms an arc-shaped magnet, whereby six arc-shaped magnets are formed.

Armature 21 includes the following structure elements:
armature core 23 having multiple teeth (eight teeth in this embodiment) and slots 24 between each of the teeth;
armature coil 22 wound on each of the teeth and accommodated in slots 24;
output shaft 28 extending through and fixed to the center of armature core 23 along the axial direction; and
commutator 25 fixed to output shaft 28.

Armature core 23 is formed by layering electromagnetic steel sheets. Each of teeth T1, T2, T3, T4, T5, T6, T7, and T8 of armature core 23 is wound with concentrated winding coil units W1, W2, W3, W4, W5, W6, W7, and W8, and those coil units are connected to segments 25s of commutator 25 via hook 25f. The foregoing winding structure is detailed later.

A first face of armature core 23, i.e. the same side as commutator 25 is placed, is referred to as a top face, and a second face thereof is referred to as a lower face hereinafter for a description purpose. FIG. 2 shows stator 11 and armature 21 as viewed from the top face.

Figure 3:
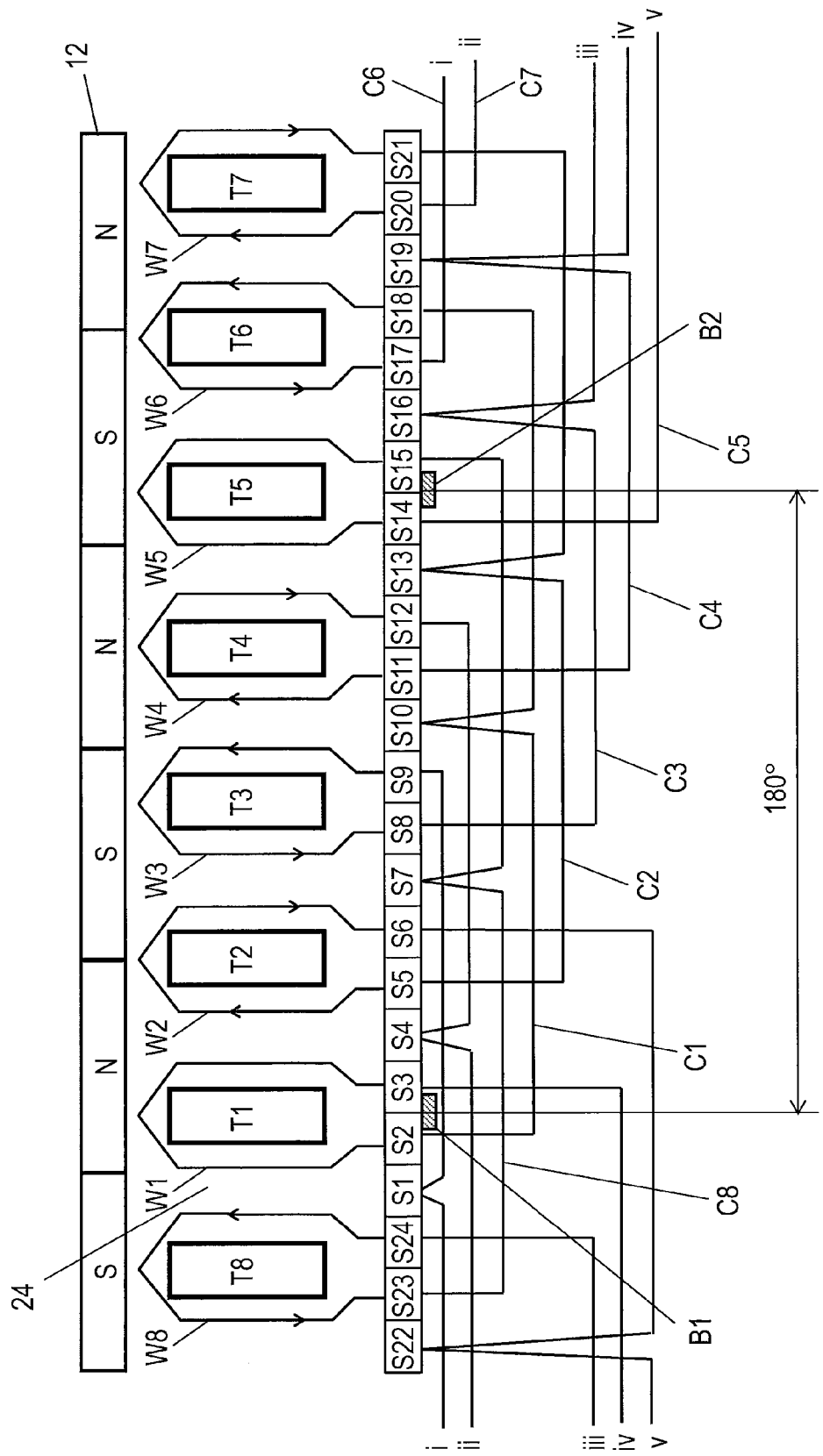
FIG. 3 is an exploded view of the windings of the dc motor.

FIG. 3 is an exploded view of the fundamental winding of the dc motor in accordance with the embodiment. Specific winding methods of the winding will be discussed later. Armature core 23 includes eight teeth, i.e. T1, T2, T3, T4, T5, T6, T7, and T8 and slots 24 provided between each of the teeth, i.e. eight slots 24 are available. Armature coil 22 includes eight concentrated winding coil units (hereinafter sometimes referred to simply as a coil unit), i.e. W1, W2, W3, W4, W5, W6, W7, and W8, and multiple connecting wire units C1, C2, C3, C4, C5, C6, C7, and C8. The coil units are wound, respectively, on the teeth in a manner of concentrated winding and are accommodated in slots 24. For instance, a wiring is wound on tooth T1 with multiple turns, thereby forming coil unit W1.

Commutator 25 includes 24 segments, i.e. segment S1-segment S24, and each one of the segments is represented by segment 25s. Segments 25s are insulated from each other, and each segment 25s has hook 25f at its tip to be connected to a coil terminal end. When the terminals of the coil units or the connecting wire units are connected to the segments, they are connected to hooks 25f at the tips of segments 25s. In the following descriptions, a simple expression such as "they are connected to segments" is sometimes used.

Brush 31 is formed of anode side brush B1 and cathode side brush B2, the two brushes are spaced apart from each other by a 180 degree mechanical angle. The two brushes are in sliding contact with segment 25s of commutator 25, and are connected to the dc power supply, so that the dc power is fed to armature coil 22 via commutator 25. In the following description, an angle refers to a mechanical angle.

Coil units W1, W2, W3, W4, W5, W6, W7, and W8 of armature, coil 22 are respectively connected to segments 25s placed adjacent to each other. To be more specific, a first terminal of some coil unit is connected to some segment 25s and a second terminal thereof is connected to another segment 25s adjacent to the some segment 25s. A concentrated winding coil unit is not connected to a segment next to the segments to which the coil unit is connected, and only a connecting wire unit is connected to this segment (more detailed description coming later). A segment, to which a first end of the concentrated winding coil unit is connected, is defined as a first segment, and another segment, to which a second end of the same concentrated winding coil unit is connected, is defined as a second segment. A segment, to which only a connecting wire unit is connected, is defined as a third segment.

Following the definitions discussed above, a pair of first and the second segments connected to the same concentrated winding coil are placed adjacent to each other, and the third segment is placed between two adjacent pairs of first and second segments. On top of that, the armature coil forms a closed series circuit with the aid of the segment groups and the connecting wire units. The first segments, second segment, and third segments are equal in number, and the total number of the segments in segment group is a sum of the numbers of the first, second, and third segments.

The arrangement of those segments will be discussed hereinafter. As shown in FIG. 3, the segment group includes 24 segments, so that intervals between the segments are 15 degrees each. Each of the first segments is spaced 45 degrees away from the adjacent first segments, and each of the second segments is spaced 45 degrees away from the adjacent second segments, and each of the third segments is spaced 45 degrees away from the adjacent third segments. Segments which are 120 degrees away from a respective first segment are a second segment and a third segment. In a similar way, segments which are 120 degrees away from a respective second segment are third and first segments. Segments which are 120 degrees away from a respective third segment are a first segment and a second segment. The first segments, second segments, and third segments are connected to each other with the connecting wire units.

Next, the winding structure of the armature coil will specifically be described hereinafter. Concentrated winding coil unit W1 wound on tooth T1 is connected to first segment S2 and second segment S3. Concentrated winding coil unit W2 wound on tooth T2 is connected to first segment S5 and second segment S6. Concentrated winding coil unit W3 wound on tooth T3 is connected to first segment S8 and second segment S9. Concentrated winding coil unit W4 wound on tooth T4 is connected to first segment S11 and second segment S12. Concentrated winding coil unit W5 wound on tooth T5 is connected to first segment S14 and second segment S15. Concentrated winding coil unit W6 wound on tooth T6 is connected to first segment S17 and second segment S18. Concentrated winding coil unit W7 wound on tooth T7 is connected to first segment S20 and second segment S21. Concentrated winding coil unit W8 wound on tooth T8 is connected to first segment S23 and second segment S24.

Next, connecting wire units C1, C2, C3, C4, C5, C6, C7, and C8 connected to third segments S1, S4, S7, S10, S13, S16, S19, and S22, respectively, are discussed in detail hereinafter. Those connecting wire units electrically connect the concentrated winding coil units to each other, and they connect the first segment, second segment, and third segment, which are placed at the intervals of 120 degrees, to each other.

To be more specific, connecting wire unit C1 is connected to first segment S2, third segment S10, and second segment S18. Connecting wire unit C2 is connected to first segment S5, third segment S13, and second segment S21. Connecting wire unit C3 is connected to first segment S8, third segment S16, and second segment S24. Connecting wire unit C4 is connected to first segment S11, third segment S19, and second segment S3. Connecting wire unit C5 is connected to first segment S14, third segment S22, and second segment S6. Connecting wire unit C6 is connected to first segment S17, third segment S1, and second segment S9. Connecting wire unit C7 is connected to first segment S20, third segment S4, and second segment S12. Connecting wire unit C8 is connected to first segment S23, third segment S7, and second segment S15.

As discussed above, the concentrated winding coil units are connected, respectively, to the segments, so that armature coil 22 can form a closed circuit. To be more specific, in FIG. 3, for instance, the circuit starting from segment S1 toward segment S9 includes a path of S1-S9-W3-S8-S16-S24-W8-S23-S7-S15-W5-S14-S22-S6-W2-S5-S13-S21-W7-S20-S4-S12-W4-S11-S19-S3-W1-S2-S10-S18-W6-S17-S1. This route forms a connected loop, so that the closed circuit is formed.

Use of the following connecting method reduces the number of connection steps needed for foregoing connecting wire units C1, C2, C3, C4, C5, C6, C7, and C8. A first end of concentrated winding coil unit W1 wound on tooth T1 is connected to first segment S2, and then, instead of being cut, extended and connected to third segment S10. Similarly, a second end of concentrated winding coil unit W6 wound on tooth T6 is connected to second segment S18, and then, instead of being cut, extended and connected to third segment S10. Accordingly, connecting wire unit C1 can be formed of the extended line of the first end of coil unit W1 and the extended line of the second end of coil unit W6, thereby reducing the number of connection steps. The other connecting wire units C2, C3, C4, C5, C6, C7, and C8 can be formed in a way similar to what is discussed above.

In this embodiment, among the connecting wire units discussed above, some of the connecting wire units pass through slots 24 to connect the concentrated winding coil units together. To be more specific, connecting wire units C1, C2, C3, C4, C5, C6, C7, and C8 do not run circumferentially on the outer wall of the commutator for connection to the commutator, but before connected to the commutator, they run away from the commutator and run through slots 24 of the armature, together with the concentrated winding coil units. This configuration, by making efficient use of the spaces inside slots 24 of the armature, can eliminate a space necessary for the connecting wire units to run around the commutator, whereby the motor can be downsized.

Anode side brush B1 and cathode side brush B2 are spaced 180 degrees away from each other, so that the centerline along the width direction (circumferential direction) can agree with the centerline along the circumferential direction of a given magnet 12. The widths along the circumferential direction of respective brushes B1 and B2 are set equal to or smaller than the widths along the circumferential direction of each segment. Brush B1 and brush B2 are thus in sliding contact with two adjacent segments simultaneously or just one segment. A time during which the brush is in the sliding contact with just one segment is extremely short, so that the time is omitted in the following description.

As FIG. 3 shows, anode side brush B1 is brought into sliding contact with segments S2 and S3 simultaneously, and cathode side brush B2, which is spaced 180 degrees away from brush B1, is brought into sliding contact with segments S14 and S15 simultaneously. A flow of electric current in this situation will be discussed hereinafter.

The electric current entering segment S2 flows through segment S18 and concentrated winding coil unit W6, and then flows through segment S17, segment S9, concentrated winding coil unit W3, segment S8, segment S24, concentrated winding coil unit W8, segment S23 in this order, and finally flows out from segment S15. Similarly, the electric current entering segment S3 flows through segment S11 and concentrated winding coil unit W4, and then flows through segment S12, segment S20, concentrated winding coil unit W7, segment S21, segment S5, concentrated winding coil unit W2, segment S6 in this order, and finally flows out from segment S14. Those flowing directions of electric currents are shown with arrows on the respective concentrated winding coil units in FIG. 3.

As discussed above, the electric current entering segment S2 flows through a series circuit formed of concentrated winding coil units W6, W3, W8, and flows out from segment S15. The electric current entering segment S3 flows through a series circuit formed of concentrated winding coil units W4, W7, W2, and flows out from segment S14. The electric current entering anode side brush B1 flows through the two parallel circuits and flows out into cathode side brush B2. This electric current flow allows the dc motor to be a self-starting motor.

Figure 4:
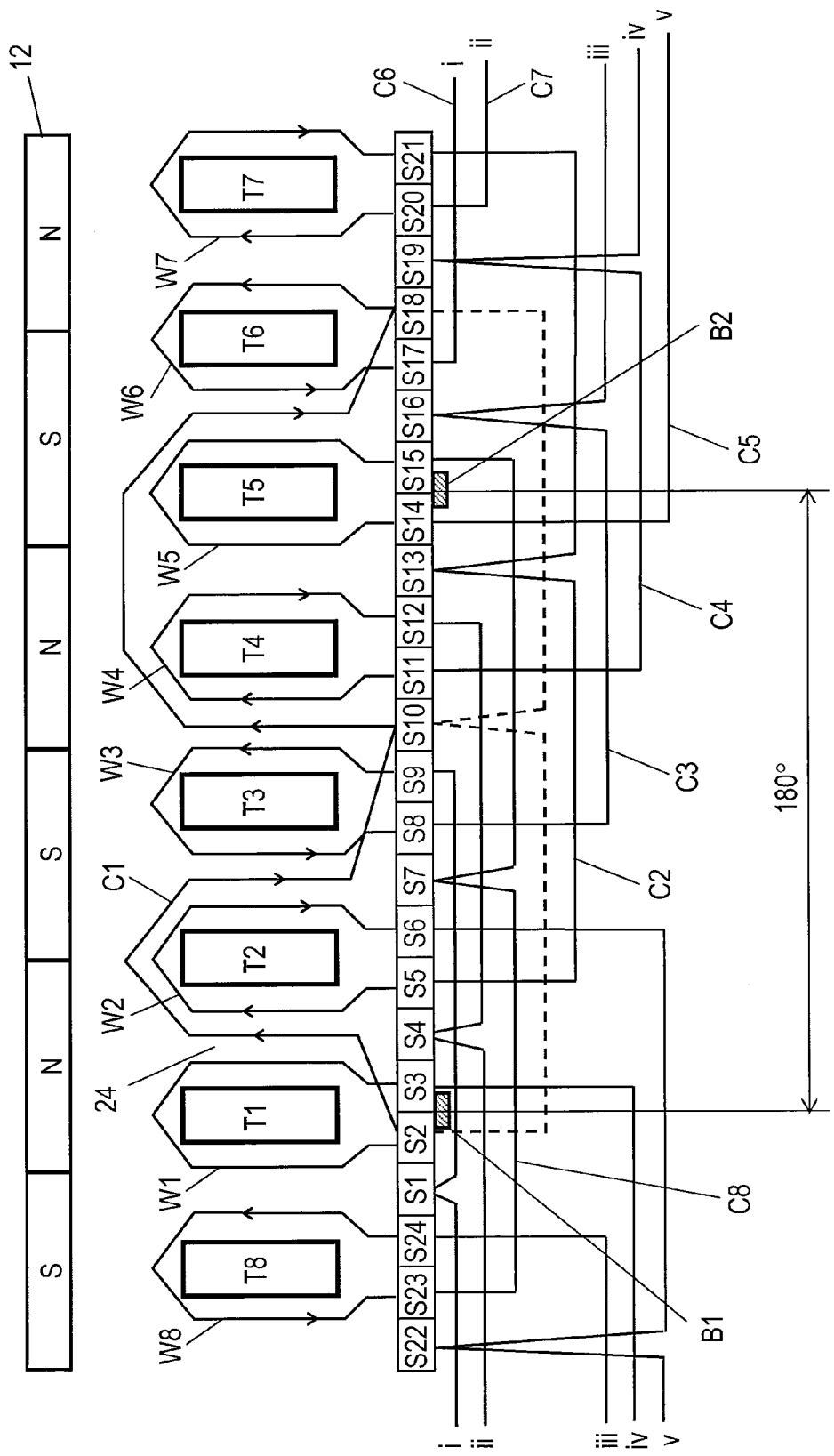
FIG. 4 is an exploded view of the windings for showing a position of a slot where connecting wire unit C1 is accommodated.

FIG. 4 shows a specific wiring example of the connecting wire unit in accordance with the embodiment. As discussed previously, some of the connecting wire units pass through slots 24 to connect the concentrated winding coil units together. To be more specific, connecting wire units C1, C2, C3, C4, C5, C6, C7, and C8 do run circumferentially on the outer wall of the commutator for connection to the commutator, but they run away from the commutator and run through slots 24 of the armature, together with the concentrated winding coil units before, before connected to the segments. In this case, some slots 24 are selected so as to maximize the number of connecting wire units over rotations of the motor each of which and the concentrated winding coil unit around which it runs flow electric current in the same direction.

FIG. 4 shows positions of slots 24 that accommodate connecting wire unit C1. Unit C1 starts from first segment S2 and passes through slot 24 between teeth T1 and T2, and through slot 24 between teeth T2 and T3, and is connected to third segment S10. Unit C1 further passes through third segment S10, slot 24 between teeth T3 and T4, slot 24 between teeth T5 and T6, and is connected to second segment S18.

Figure 5:
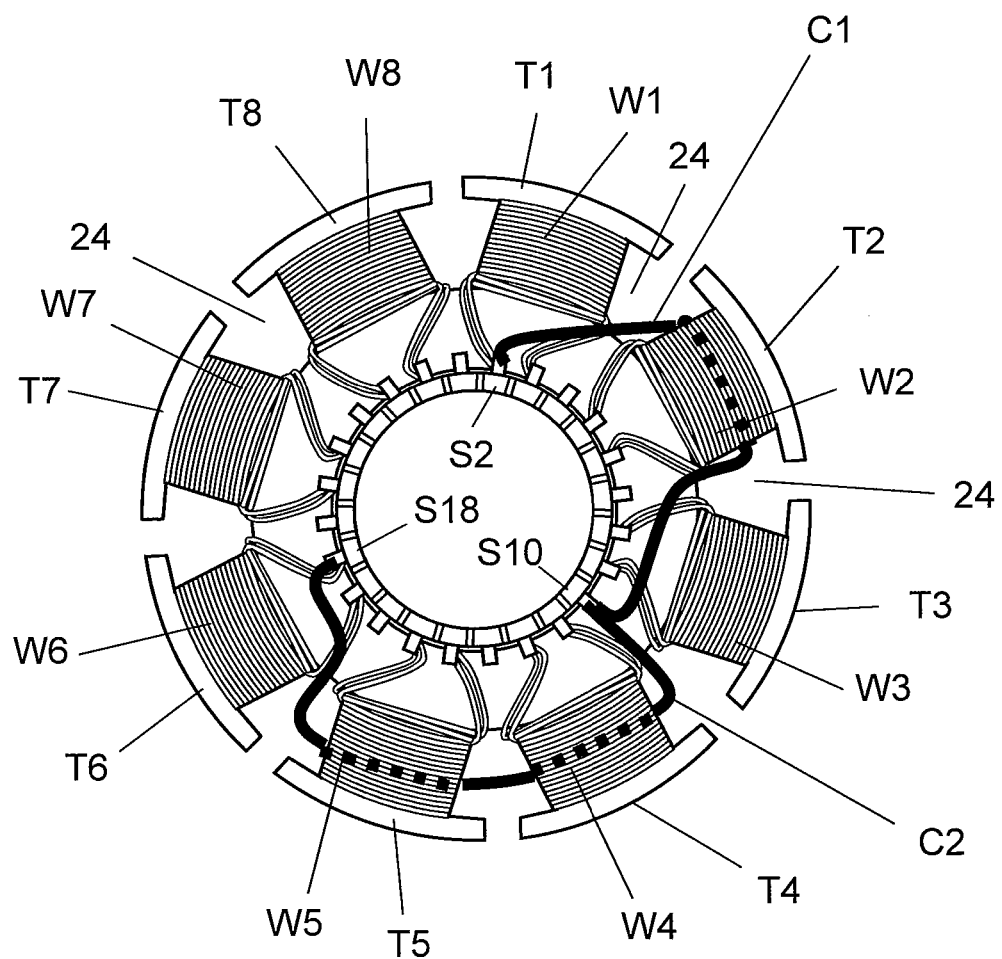
FIG. 5 shows a structure of connecting wire unit C1 of the dc motor.

FIG. 5 further shows in detail the connection configuration of connecting wire unit C1 shown in FIG. 4. As shown in FIG. 5, connecting wire unit C1 starts from first segment S2 placed on an upper face of armature core 23, and passes through slot 24 between teeth T1 and T2, and runs behind armature core 23, i.e. runs on the underside of tooth T2, as shown with a broken line. Unit C1 then passes through slot 24 between teeth T2 and T3, and returns to the upper side, and is connected to third segment S10. Unit C1 departing from third segment 10 passes through slot 24 between teeth T3 and T4, and runs behind armature core 23, i.e. runs on the underside of teeth T4 and T5, passes through slot 24 between teeth T5 and T6, and then returns to the upper side, and is finally connected to second segment S18. As discussed above, in this dc motor in accordance with the embodiment us configured such that the connecting wire unit starting from a segment passes through a slot 24, and runs behind the armature core, i.e. runs on the underside of the teeth, and passes through another slot 24, and returns to the third segment.

The direction of electric current of connecting wire unit C1 in each slot 24 is indicated with arrows, and as the arrows show, the direction of electric current of unit C1 agrees with that of the concentrated winding coil unit in the same slot 24. The positions of the brushes change in response to the rotation of the motor, so that the directions of electric current change accordingly. The direction of electric current of the connecting wire unit therefore does not always agree with that of the concentrated winding coil unit; however, the connecting wire units are accommodated in selected slots 24 where the agreement occurs more frequently.

As shown in FIG. 4 and FIG. 5, connecting wire unit C1 makes a half turn around tooth T2, and a half turn around teeth T4, T5; however it can make multiple turns, and the number of turns round each tooth can be determined appropriately.

Figure 6:
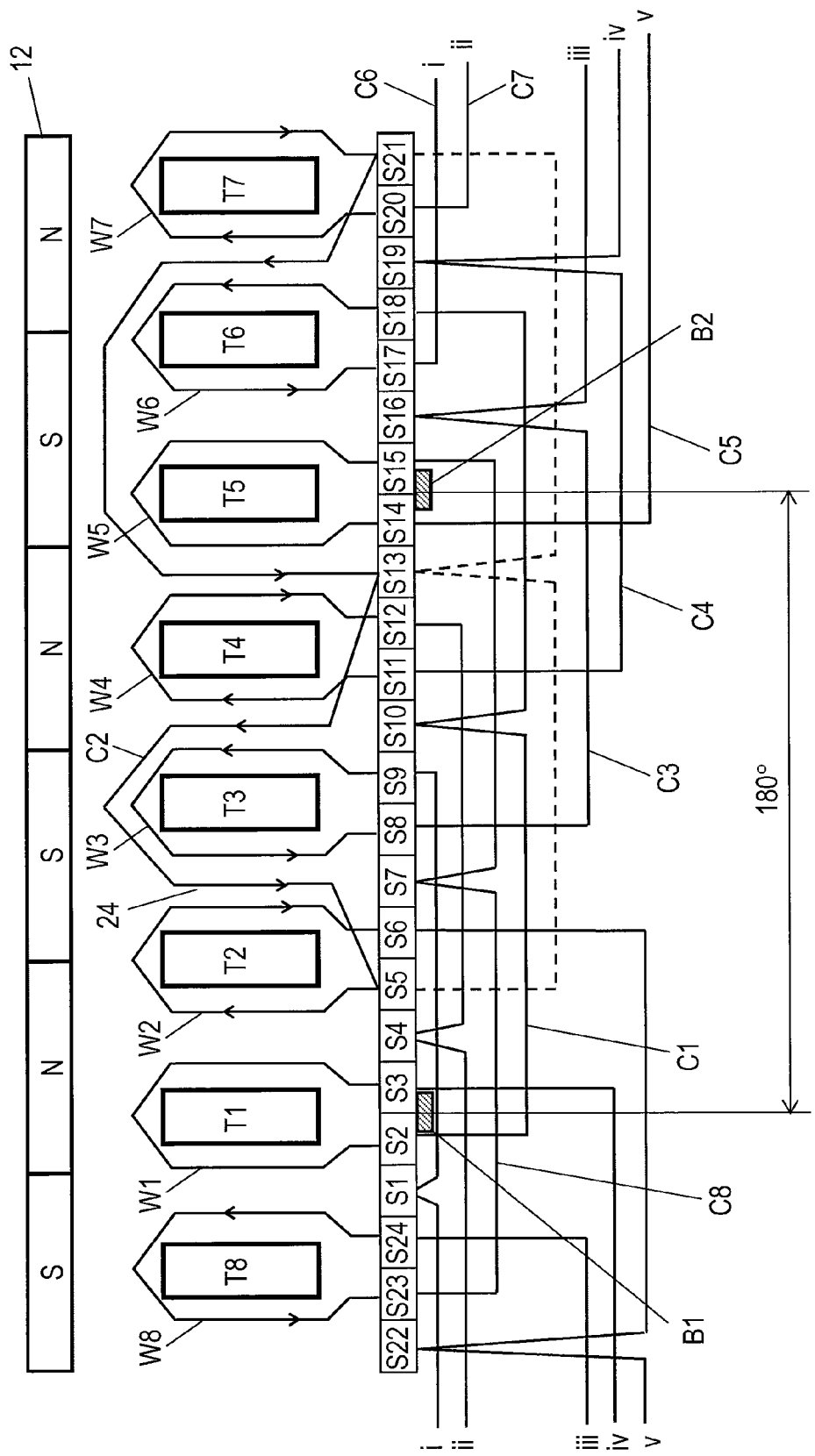
FIG. 6 is an exploded view of the windings for showing a position of a slot where connecting wire unit C2 is accommodated.

Next, FIG. 6 shows the positions of slots 24 in which connecting wire unit C2 is accommodated. Unit C2 starts from first segment S5, runs through slot 24 between teeth T2 and T3, slot 24 between teeth T3 and T4, and is connected to third segment S13, and then runs from segment S13, and passes through slot 24 between teeth T4 and T5, slot 24 between teeth T6 and T7, and is connected to second segment S21. The direction of electric current of connecting wire unit C2 in each slot 24 is indicated with arrows, and as the arrows show, the direction of electric current of unit C2 agrees with that of the concentrated winding coil unit in the same slot 24.

In this example, connecting wire unit C2 can make multiple turns on the foregoing teeth, and the number of turns on each tooth can be determined appropriately.

As discussed above, the positions of slots 24, in which connecting wire units C1 and C2 are accommodated, are shown. Other connecting wire units C3, C4, C5, C6, C7 and C8 can run through selected slots 24 such that the directions of electric current of those units can agree with those of the concentrated winding coil units.

It is preferable that all the multiple connecting-wire units C1-C8 should pass through slots 24 and connect the concentrated winding coil units together. However, it may be configured such that some connecting wire units connect some of the concentrated winding coil units only on the upper face side of armature core 23. In other words, it may be configured such that some connecting wire units pass through slots 24 and connect the concentrated winding coil units together. This structure reduces a size of a bulge caused by the concentration of connecting wire units around the commutator, whereby the dc motor can be downsized.

Figure 7:
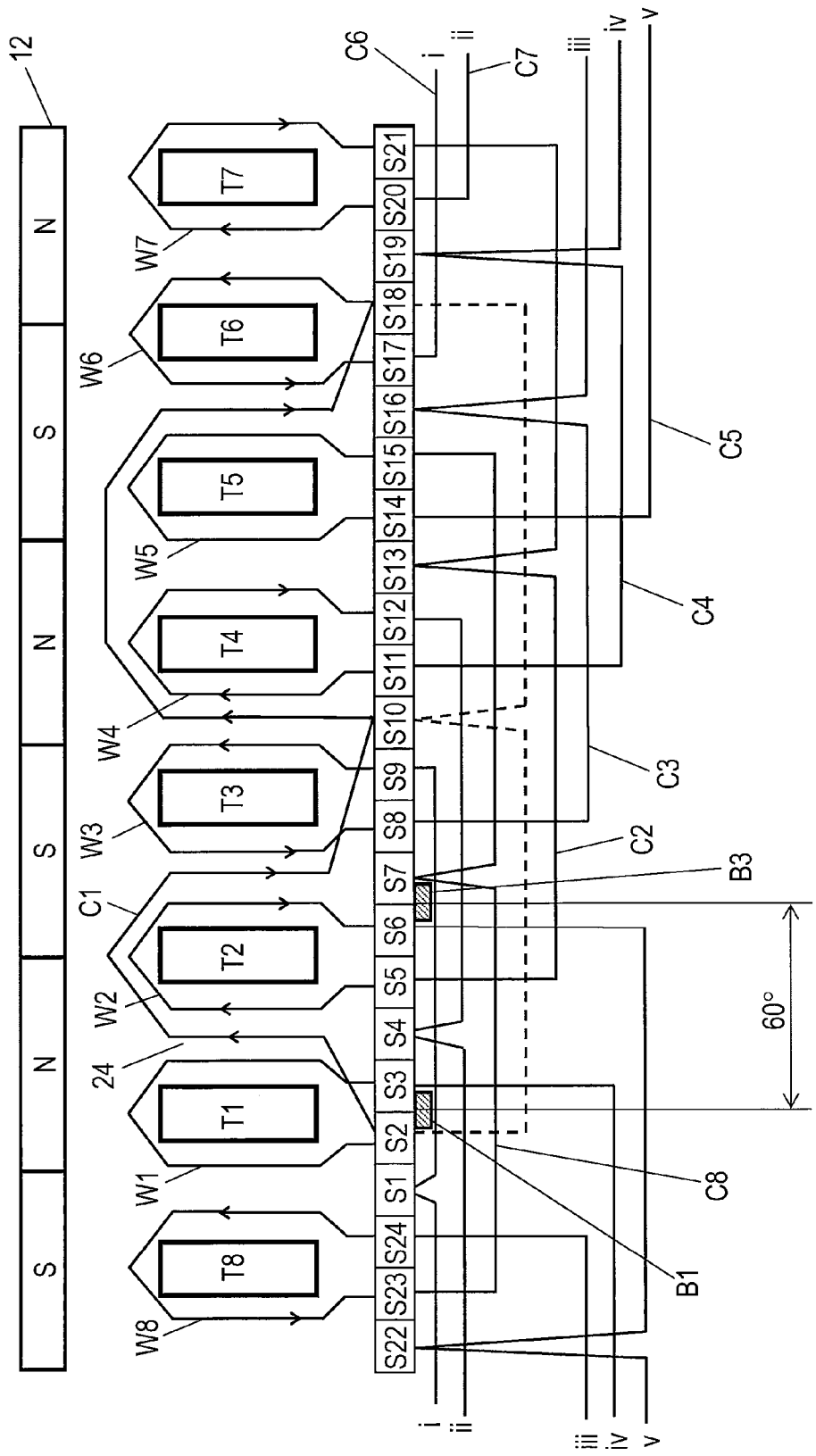
FIG. 7 is an exploded view of the windings for showing a position of a slot where connecting wire unit C1 is accommodated in the case of employing the brushes apart at intervals of 60 degrees from each other.
Figure 8:
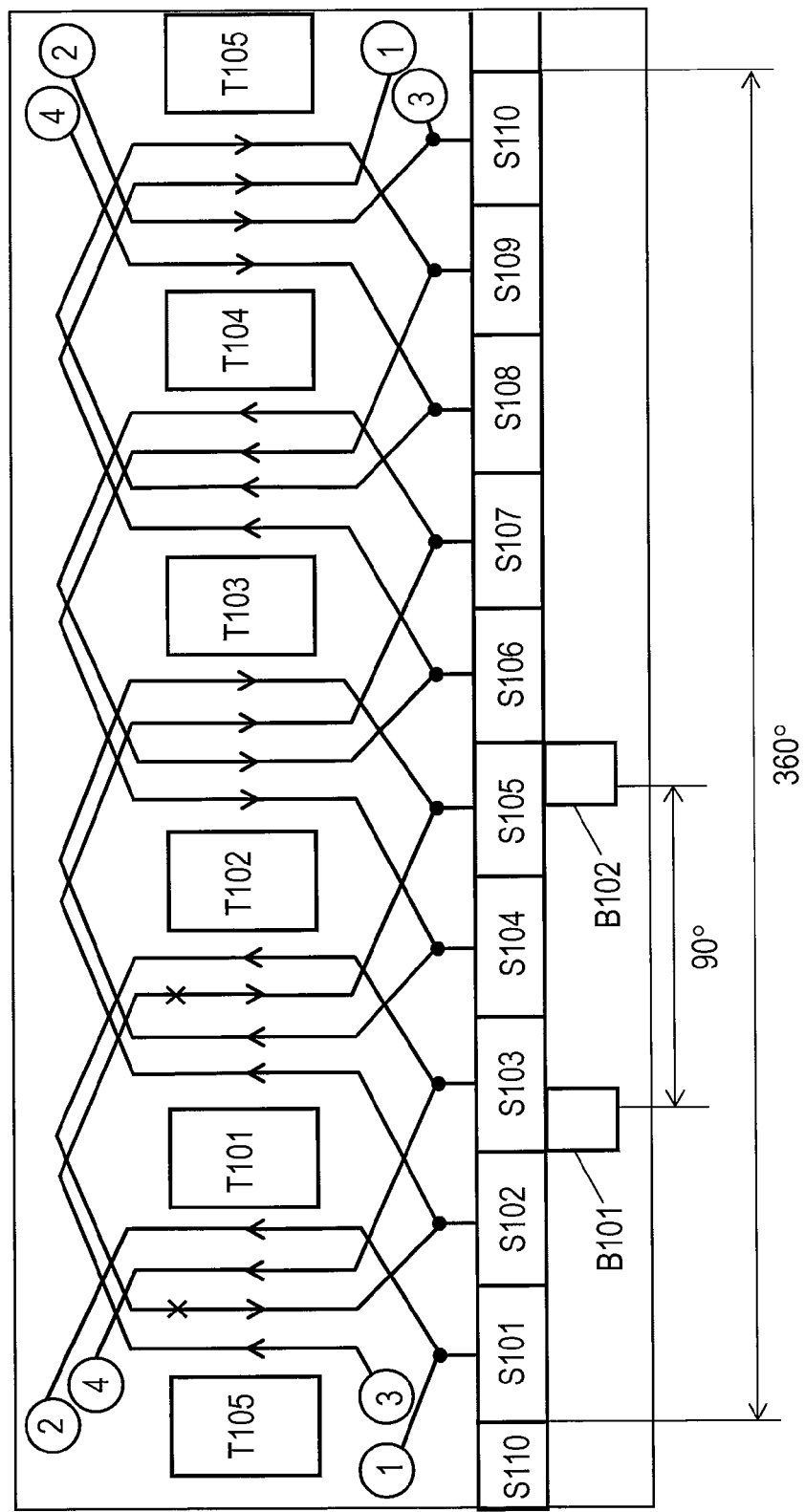
FIG. 8 is an exploded view of windings of a conventional dc motor.

In the foregoing discussion, anode side brush B1 and cathode side brush B2 are spaced 180 degrees away from each other; however they can be placed at 60-degree intervals as shown in FIG. 7, instead of the structure shown in FIG. 4. To be more specific, cathode side brush B3 is placed at a 60-degree interval from anode side brush B1. In this case, anode side brush B1 is brought into sliding contact with segments S2 and S3 simultaneously, and cathode side brush B3 spaced 60 degrees away from brush B1 is brought into sliding contact with segments S6 and S7 simultaneously. As a result, electric current flows such that the electric current entering segment S2 passes through segment S18, concentrated winding coil unit W6, segments S17 and S9, concentrated winding coil unit W3, segments S8 and S24, concentrated winding coil unit W8, and segment S23 in this order, and finally flows out from segment S7. Similarly, the electric current entering segment S3 passes through segment S11, concentrated winding coil unit W4, segments S12 and S20, concentrated winding coil unit W7, segments S21 and S5, concentrated winding coil unit W2, and finally flows out from segment S6. Those flows of electric current are indicated with arrows at each concentrated winding coil unit in FIG. 7.

In the case of having a 60-degree interval between the brushes, the electric current entering segment S2 passes through the series circuit formed of concentrated winding coil units W6, W3, W8, and flows out from segment S7. The electric current entering segment S3 passes through the series circuit formed of concentrated winding coil units W4, W7, W2, and flows out from segment S6. As discussed above, the electric current entering anode-side brush B1 flows through the two parallel circuits, and flows out from cathode-side brush B3. In this case, concentrated winding coil W1 is shorted and coil W5 is also shorted, and they are not involved in increasing the driving torque.

This is because segment S14 is connected to segment S6 with connecting wire unit C5, and segment 15 is connected to segment S7 with connecting wire unit C8, so that cathode side brush B3 being in sliding contact with segments S6 and S7 shorts concentrated winding coil unit W5. There are no coils through which current runs inversely, and this is the same as in the case where the brushes are spaced 180 degrees away from each other.

Next, the position of slot 24, in which connecting wire unit C1 is accommodated, is described hereinafter. Connecting wire unit C1 starts from first segment S2, and runs through slot 24 between teeth T1 and T2, slot 24 between teeth T2 and T3, and is connected to third segment S10, and then further runs from third segment S10, and runs through slot 24 between teeth T3 and T4, slot 24 between teeth T5 and T6, and is finally connected to second segment S18. The directions of electric current at slots 24 are indicated with arrows. The current directions at slots 24 agree with those of the concentrated winding coil units. Since the positions of brushes change in response to the rotation of the motor, the current directions change accordingly. The direction of electric current of the connecting wire unit therefore does not always agree with that of the concentrated winding coil unit; however, the connecting wire units are placed to run through selected slots 24 such that an agreement of current direction occurs more frequently. The number of turns of this connecting wire unit C1 is determined appropriately.

The number (T) of segments of segment group of the dc motor in accordance with the embodiment is determined as follows:

T=(½) PN, where P is the number of poles of field magnet pole, N is the number of concentrated winding coil units, (N is equal to the number of slots and the number of teeth). P is an even number division by 2 of which is an odd number, and the number of coil units N is an even number not equal to a multiple of P by an integer. To be more specific, the foregoing values are selected to satisfy the equation of T=(½) PN: number of segments T=24, number of magnet poles P=6, and number of concentrated winding coil units N=8.

Concentrated winding coil units W1-W8 and connecting wire units C1-C8 are formed of conductive wires covered with an insulating layer. A thickness, material and a number of layers of the insulating layer are determined appropriately accordingly to the specification of the dc motor. The conductive section of the conductive wire, i.e. the core wire of the conductive wire, is made of material selected from a group consisting copper, aluminum, copper alloy, aluminum alloy, an alloy including at least copper and aluminum, aluminum or aluminum alloy containing a very small amount of impurity, and magnesium alloy. The material is selected appropriately for the specification of the dc motor. The conductive wire covered with the insulating layer can be selected from a group consisting of a solid wire, double wire, Litz wire (stranded wire) appropriately for the specification of the dc motor.

In this dc motor of the present invention, an armature coil is wound on each tooth by a concentrated winding method, so that a space factor of each slot can be improved. The armature coil forms a closed circuit with the aid of the group of segments and the connecting wire unit, and also forms two parallel circuits. There are no concentrated winding coil units through which an inverse electric current flows. The dc motor also reduces the number of shorted concentrated winding coil units, and regulates the change in inductance of the armature coil. The slots, in which the connecting wire units are accommodated, are selected such that the current direction of the connecting wire unit agrees with that of the concentrated winding coil units with greater frequencies at the selected slots. As a result, the connecting wire units can increase the torque. The foregoing structure also mitigates the sparks occurring between the segments of the commutator, and provides the dc motor that is superior in the driving efficiency, smaller in size, and lighter in weight.

INDUSTRIAL APPLICABILITY

A dc motor of the present invention includes brushes and a commutator, and is good for driving automotive electronics or electric tools. This dc motor regulates sparks occurring between each segment of the commutator, increases the driving efficiency, and downsizes the dc motor and reduces the weight of the dc motor.

The invention claimed is:
1. A dc motor comprising:
a stator that comprises a plurality of field magnet poles;
an armature core that comprises a plurality of teeth and slots formed between two adjacent teeth;
an armature coil that comprises a plurality of concentrated winding coil units each individually wound on a different one of the teeth in the slots and a plurality of connecting wire units each electrically connecting two of the plurality of concentrated winding coil units;
a commutator that is formed of a group of segments, and
a brush that is in sliding contact with the segments for feeding the armature coil with electric power,
wherein the group of segments of the commutator include first segments connected, respectively, with first ends of the concentrated winding coil units, second segments connected, respectively, with second ends of the concentrated winding coil units, and third segments connected only with the connecting wire units,
wherein a pair of first and second segments connected to the same concentrated winding coil unit are placed adjacent to each other, and one of the third segments is disposed between two adjacent pairs of the first and second segments,
wherein an mechanical angle of 45 degrees exists between adjacent two first segments, between adjacent two second segments and between adjacent two third segments, and
wherein the plurality of connecting wire units include a connecting wire unit connected in such a manner that the connecting wire unit:

(1) starts from one of the first segments;
(2) passes through a slot formed between a first coil unit connected to the one of the first segments and a second coil unit adjacent to the first coil unit;
(3) winds generally a half turn around the second coil unit;
(4) connects to one of the third segments that is located a 120-degree mechanical angle away from the one of the first segment;
(5) starts from the one of the third segments;
(6) passes through a slot between a third coil unit adjacent to the second coil unit and a fourth coil unit adjacent to the third coil unit, the one of the third segments being located between second and first segments of the third and fourth coil units;
(7) winds generally a half turn around the fourth coil unit and a fifth coil unit adjacent to the fourth coil unit; and
(8) connects to one of the second segments located a 120-degree mechanical angle away from the one of the third segments.

2. The dc motor of claim 1, wherein the armature coil forms a closed series circuit with the concentrated winding coil units and the connecting wire units connected via the group of segments.

3. The dc motor of claim 1, wherein the first segments, the second segments, and the third segments are equal in number in the group of segments, and a total number of the segments in group is a sum of the numbers of the first, the second and the third segments.

4. The dc motor of claim 1 satisfying an equation of:

$$T=(1/2)PN,$$

where T is a number of the segments of the group;
P is a number of magnet poles of the field magnet poles; and
N is a number of the concentrated winding coil units of the armature coils.

5. The dc motor of claim 4, wherein P is an even number whose division by 2 results in an odd number, and N is an even number not equal to P multiplied by an integer.

6. The dc motor of claim 4, wherein P=6, N=8, and T=24.

7. The dc motor of claim 1, wherein the brush includes a pair of an anode side brush and a cathode side brush, and they are disposed 180 degrees or 60 degrees away from each other in mechanical angles.

8. The dc motor of claim 1, wherein the brushes contact two adjacent segments simultaneously and create two parallel electrical circuits through which the brushes feed the armature coil with electric power.

9. The dc motor of claim 1, wherein the armature coil has a core wire made of alloy containing at least copper and aluminum, or one of aluminum or aluminum alloy containing a small amount of impurity.

* * * * *